United States Patent [19]

Takasuga

[11] 4,146,160
[45] Mar. 27, 1979

[54] INDEXING APPARATUS FOR BAND-SHAPED WORKS

[75] Inventor: Yutaka Takasuga, Kodaira, Japan

[73] Assignee: Bridgestone Tire Company Limited, Tokyo, Japan

[21] Appl. No.: 865,113

[22] Filed: Dec. 28, 1977

[30] Foreign Application Priority Data

Dec. 29, 1976 [JP] Japan .............................. 51/160008

[51] Int. Cl.² ............................................ B65H 17/26
[52] U.S. Cl. ................................... 226/136; 226/141; 226/156
[58] Field of Search .................. 226/136, 141, 156, 37

[56] References Cited

U.S. PATENT DOCUMENTS

| | | | |
|---|---|---|---|
| 3,078,734 | 2/1963 | Wiig | 226/156 X |
| 3,315,862 | 4/1967 | Schwardt | 226/136 |

*Primary Examiner*—Richard A. Schacher
*Attorney, Agent, or Firm*—Cushman, Darby & Cushman

[57] ABSTRACT

A highly accurate and reliable indexing apparatus for progressively indexing a band-shaped work such as a breaker ply of a preset length using steel cords in high accuracy. The indexing apparatus does not use any electric converter but uses a control mechanism. The apparatus includes starting point determining means for determining the starting point of the work loaded to a rotary drum. Further inclusive is end point determining means for determining the end point of the work loaded to and delivered from the rotary drum. Rotation interrupting means is interposed between the rotary drum and an electric motor for interrupting the transmission of the rotations of the spindle by the motor to the rotary drum. Further inclusive is indexing means for suitably indexing the work loaded to and delivered from the rotary drum. Further inclusive is idle rotation preventive means for preventing the rotary drum from its idle rotations.

5 Claims, 4 Drawing Figures

INDEXING APPARATUS FOR BAND-SHAPED WORKS

The present invention relates generally to an indexing machine for progressively indexing a band-shaped work, and more particularly to a highly reliable indexing apparatus for progressively delivering a breaker ply of a preset length using steel cords in high accuracy.

In most of the conventional indexing apparatus of the above type, the indexing operations of a band-shaped work are carried out by once converting a preset physical length of the band-shaped work to be indexed into an electric signal and by subsequently reconverting the electric signal into a mechanical delivering signal. In the conventional indexing apparatus, however, since the reconversion error, which takes place when the electric signal is reconverted into the mechanical delivering signal, is added to the original conversion error which takes place when the physical length of the band-shaped work is converted into the electric signal, the total convertion error takes a remarkably large value in the course of the whole conversion of the physical length of the work into a mechanical delivering signal. As a result, the obtainable accuracy in the indexing operation of the band-shaped work is at a remarkably low level. In order to improve the accuracy of the indexing operation, therefore, the conventional indexing apparatus has to be equipped with a mechanical indexing mechanism of unnecessarily high accuracy as well as such a highly accurate electric converter as is balanced with the former. Thus, the conventional indexing apparatus cannot be free from the disadvantages that it becomes highly expensive as a whole and that it occupies a remarkably large physical space.

It is, therefore, an object of the present invention to provide an improved indexing apparatus for progressively indexing a band-shaped work, which is completely free from the drawbacks concomitant with the prior art.

Another but major object of the present invention is to provide a highly accurate and reliable indexing apparatus of the above type, in which a control mechanism only is used without any use of an electric converter, thus reducing the production cost and simplifying the construction.

According to a major feature of the present invention, therefore, there is provided an indexing apparatus for progressively indexing a band-shaped work, comprising: a relatively stationary frame; a spindle rotatably supported in said stationary frame; a rotary drum rotatably supported on said spindle and having such an outer periphery of cylindrical shape as can prevent slippage with said band-shaped work; starting point determining means mounted to said spindle for applying a preset load to said spindle in accordance with the single operational command, which is detected during one rotation of said spindle, so as to determine the starting point of said band-shaped work loaded to said rotary drum; end point determining means mounted to said spindle for applying a preset load to said spindle in accordance with the single operational command, which is detected during one rotation of said spindle, so as to determine the end point of said band-shaped work loaded to and delivered from said rotary drum; drive means for driving said spindle and for absorbing the difference in the number of rotations from the spindle which is retarded in its number of rotations by the preset loads given thereto from said starting point determining means and said end point determining means; rotation interrupting means interposed between said rotary drum and said drive means for interrupting the transmission of the rotations of said spindle by said drive means to said rotary drum so that the rotations of said spindle by said drive means may be transmitted to said rotary drum only when said end point determining means is to be operated; indexing means for suitably presetting the timing of the operational command, which is to be detected by said end point determining means, so as to suitably index the band-shaped work which is loaded to and delivered from said rotary drum; and idle rotation preventive means for applying a slight load to said rotary drum at all times so as to block said rotary drum from its idle rotations.

An indexing apparatus for band-shaped works according to the present invention will now be described in detail in conjunction with the accompanying drawings.

Figure 1:
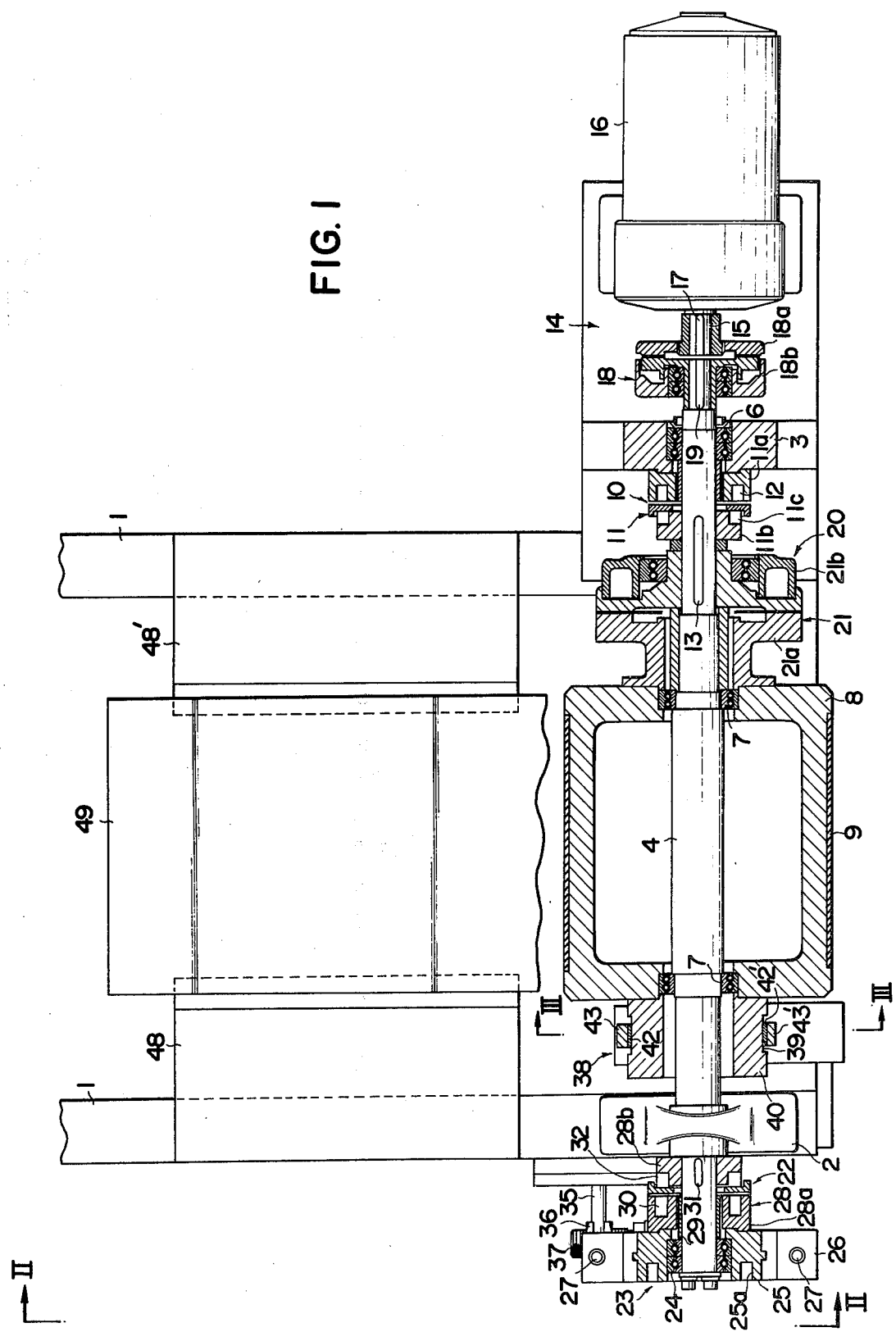
FIG. 1 is a partially sectional top plan view showing an indexing apparatus according to the present invention.
Figure 2:
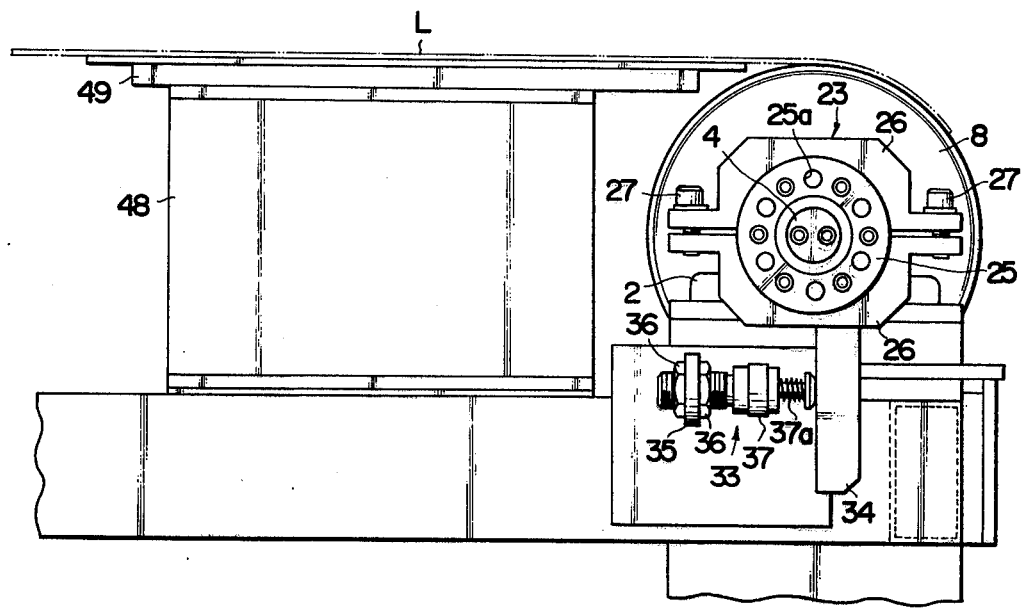
FIG. 2 is a section taken along line II—II of FIG. 1.
Figure 3:
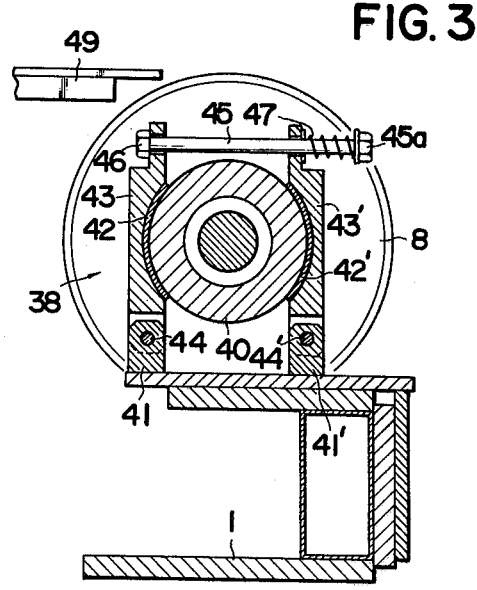
FIG. 3 is a section taken along line III—III of FIG. 1.

Indicated at numeral 1 in FIGS. 1, 2 and 3 is a stationary frame of the indexing machine, to which a pair of bearing stands 2 and 3 are mounted at a preset spacing inbetween. A spindle 4 is inserted into the bearing stands 2 and 3 such that its both end portions project outwardly from the stands 2 and 3. The spindle 4 is rotatably supported in bearings 5 and 6, which are mounted in their stands 2 and 3. The bearing 5 is similar to the other bearing 6 although it is not shown in FIG. 1. There is located at a center portion of the spindle 4 a rotary drum 8 of cylindrical shape, which is rotatably supported in a pair of bearings 7. In the outer periphery of the rotary drum 8 thus arranged, there are embedded a number of permanent magnet plates 9 which are operative to attract by their magnetic forces the metal cords of a band-shaped work L of a breaker ply, in which the metal cords are impregnated with rubber in the present example, while eliminating the slippage which might otherwise take place between the rotary drum 8 and the band-shaped work L. A starting point determining mechanism 10 is mounted to the spindle 4 in a position inside of the bearing stand 3 and in the vicinity of the rotary drum 8. The starting point determining mechanism 10 thus mounted is made responsive to the operational command, which is detected during one rotation of the spindle 4, so as to apply a preset load to the spindle 4 thereby to determine the starting point of the indexed motion of the band-shaped work L which is fed to the rotary drum 8. The starting point determining mechanism 10 is constructed to include a single-position brake 11 of known type. This single-position brake 11 is composed of a fixed portion 11a, which is fixed to the inner wall of the bearing stand 3 and which is equipped with an electromagnet 12 in its inside, and a rotatable portion 11b which is partially made of a ferromagnetic material and which is supported on the spindle 4 such that it is made axially slidable through a key 13 anchored to the spindle while being made rotatable together with the spindle 4. The rotatable portion 11b can mesh with the fixed portion once during its one rotation. There is mounted to the rotatable portion 11b at the side facing the fixed portion 11a an elastic member 11c, which has a weaker elastic force than the magnetic force of the electromagnet 12 and which is biased to effect separation of the fixed portion 11a and the rotatable portion 11b so as to prevent the meshing engagement inbetween when the electromagnet 12 is not energized. There is provided at one end of the spindle 4 a drive mechanism 14 which is equipped on the stationary frame 1 with such an electric motor 16 as has its drive shaft 15 arranged in end-to-end relationship with the spindle 4. The drive shaft 15 of the electric motor 16 is keyed at 17 to one friction disc 18a of a torque limiter 18 while the end of the spindle 4 facing the drive shaft 15 is keyed at 19 to the other friction disc 18b of the torque limiter 18. The torque limiter 18 thus coupled is made operative to transmit the rotations of the motor 16 at a steady state to the spindle 4, when there is no heavy load exerted upon the spindle 4, and to establish the slippage between the friction discs 18a and 18b, when there is a heavy load exerted upon the spindle 4 to invite substantial difference in the number of rotations between the spindle 4 and the drive shaft 15 of the electric motor 16, so that the difference in the number of rotations may be eliminated. In the present embodiment, it should be noted here that the drive mechanism 14 is constructed to include the electric motor 16, which is operative to ensure the rotations of the spindle 4 at a steady state, and the torque limiter 18 which is operative to absorb the difference in the number of rotations between the motor 16 and the spindle 4, when the latter is retarded by a heavy load, so that the steady rotations of the former may not be transmitted to the latter. However, it should be understood that the drive mechanism 14 to be used in the present invention need not be limited to the above combination. The drive mechanism 14 of the present invention may include a pneumatic or hydraulic motor which can rotate in synchronism with the number of rotations of the spindle 4, which is varied upon reception of a heavy load. There is interposed between the rotary drum 8 and the single-position brake 11 a rotation interrupting mechanism 20 which is made operative to interrupt the transmission of the rotations of the spindle 4 to the rotary drum 8 through the drive mechanism 14. The rotation interrupting mechanism 20 is constructed to include a friction clutch 21 of known type, which can be free from any back-lash when it effects coupling between the rotary drum 8 and the spindle 4 so as to transmit the rotations of the latter to the former. The friction clutch 21 thus constructed is composed of a friction disc 21a, which is fixed to the rotary drum 8 at the side facing the bearing stand 3, and the other friction clutch 21b which is supported on the spindle 4 such that it is axially slidable through the key 13 while being rotatable together with the spindle 4. Thus, the rotations of the spindle 4 are transmitted to the rotary drum 8, when the two friction clutches 21a and 21b are in engagement with each other, but are not transmitted to the same when the friction clutches 21a and 21b are out of engagement. At the other end portion of the spindle 4 outside of the bearing stand 2, there is located an end point determining mechanism 22 which is made operative to determine the end point of the indexed motion of the band-shaped work L delivered by the rotations of the rotary drum 8. The end point determining mechanism 22 is also made operative to impart a preset load to the spindle 4 in response to the operational command which is detected during one rotation of the spindle 4. In the vicinity of the end point determining mechanism 22, there is located an indexing mechanims 23 which is made operative to suitably preset the timing of the operational command to be detected by the end point determining mechanism 22, thus suitably presetting the indexed motion of the band-shaped work L delivered by the rotary drum 8. As better seen from FIGS. 1 and 2, the indexing mechanism 23 is constructed to include an indexing member 25 which is rotatably supported at the other end of the spindle 4 by means of a bearing 24. The indexing member 25 is firmly clamped in a split holder by means of bolts 27. A plurality of holes 25a formed in the outer side of the indexing member 25 so that the indexing member 25 may be turned, after the bolts 27 are loosened, relative to the split holder 26 by fitting a suitable tool in the holes 25a. In this way, the timing of the operational command to be detected by the end point determining mechanism 22 can be preset at a suitable level. The end point determining mechanism 22 thus far described is constructed to include a single-position brake 28 of known type which is interposed between the indexing mechanism 23 and the bearing stand 2. This single-position brake 28 is composed of a fixed portion 28a, which is equipped with an electromagnet 30 in its inside, which is fixed to the inner side of the indexing member 25 and which is rotatably supported on the spindle 4 through a bearing bush 29, and a rotatable portion 28b which is partially made of a ferromagnetic material and which is supported on the spindle 4 such that it is made axially slidable through a key 31 fixed to the spindle 4 while being rotatable together with the spindle 4. The meshing engagement between the fixed portion 28a and the rotatable portion 28b can take place once during one rotation of the latter. There is mounted to the rotatable portion 28b at the side facing the fixed portion 28a an elastic member 32 which has a weaker elastic force than the magnetic force of the electromagnet 30. The elastic member 32 thus mounted is made operative to effect separation of the rotatable portion 28b and the fixed portion 28a so that the both portions 28b and 28a may be prevented from their meshing engagement when the elctromagnet 30 is deenergized. The end point determining mechanism 22 is constructed to further include shock absorber means 33 partly for damping the abrupt reduction in the number of rotations of the spindle 4, which takes place when a preset load is imparted to the spindle 4 from the end point determining mechanism 22, and partly for absorbing the remarkably great impact which is exerted upon the indexing apparatus of the invention as a whole as a result of the reduction in the number of rotations of the spindle 4. As best seen from FIG. 2, the shock absorber means 33 is constructed to include a shock absorber operating member 34 which is formed to extend vertically downwardly from the lower side of the split holder 26. A shock absorber 37 is mounted to a bracket 35, which in turn is fixed to the stationary frame 1, by means of a nut 36 such that its position can be adjusted. The shock absorber 37 thus mounted has its leading end abutting against the shock absorber operating member 34 so as partly to damp in cooperation with the shock absorber operating member 34 the abrupt reduction in the number of rotations of the spindle 4, which takes place when a preset load is imparted to the spindle 4 from the end point determining mechanism 22, and partly to absorb the remarkably great impact which is exerted upon the indexing apparatus as a whole as a result of the reduction in the number of rotations of the spindle 4. There is interposed between the bearing stand 2 and the rotary drum 8 an idle rotation preventive mechanism 38 which is made operative to apply a slight load to the rotary drum 8 at all times so as to prevent the idle rotation of the same. The idle rotation preventive mechanism 38 is constructed to include a brake drum 40, which is fixed to the rotary drum 8 at the side facing the bearing stand 2 and which is formed with an annular groove 39 in its outer periphery. There are anchored to the stationary frame 1 below the brake drum 40 a pair of upright brackets 41 and 41' which are arranged at a preset spacing inbetween. There are pivotally connected to the brackets 41 and 41' a pair of arms 43 and 43', which have their opposed faces equipped with brake shoes 42 and 42'. The arms 43 and 43' are also connected at their upper ends by means of a bolt 45 and a nut 46 such that their brake shoes 42 and 42' are brought into contact with the bottom of the annular groove 39 of the brake drum 40. A compression spring 47 is mounted on the bolt 45 between the head 45a of the bolt 45 and the upper end of the arm 43' so that the brake drum 40 may be clamped under a preset load at all times by the arms 43 and 43'. The load imparted at all times to the rotary drum 8 by the idle rotation preventive mechanism 38 is intended merely to prevent the rotary drum 8 from rotating idly. Therefore, the level of the load is preset so slight that the steady rotation of the electric motor 16 may be transmitted without any influence to the rotary drum 8 when it is coupled to the spindle 4 by the action of the rotation interrupting mechanism 20. There are fixed to the stationary frame 1 a pair of guide plate supporting members 48 and 48' which are juxtaposed to each other. There is mounted horizontally on the guide plate supporting members 48 and 48' a guide plate 49 which is constructed to extend to the neighbourhood of the rotary drum 8. Thus, the band-shaped work L can be supported stably on the guide plate 49 so that it may be fed progressively to the rotary drum 8.

The operations of the indexing apparatus according to the present invention will now be described in the following.

First of all, the steady rotations of the electric motor 16 are started. In this meanwhile, however, the band-shaped work L remains stationary in its original position although it is loaded on the rotary drum 8. This is partly because the leading end of the band-shaped work L, which is to be subjected to the indexed motion on the guide plate 49, has its metal cords attracted by the permanent magnet plates 9 into contact with the rotary drum 8, and partly because the brake drum 40 is clamped under a preset load at all times through the biasing force of the compression spring 47 by the actions of the arms 43 and 43' of the idle rotation preventive mechanism 38, with the result that a slight load is applied at all times to the rotary drum 8 from the clamped brake drum 40 to prevent the rotary drum 8 from its free rotations. On the other hand, the fixed portion 11a and the rotatable portion 11b of the single-position brake 11 are separated by the biasing action of the elastic member 11c. Likewise, the fixed portion 28a and the rotatable portion 28b of the other single-position frame 28 are separated by the biasing action of the elastic member 32. Moreover, the friction discs 21a and 21b of the friction clutch 21 are in their separated positions. As a result, the rotations of the electric motor 16 are transmitted from its drive shaft 15 to the spindle 4 by way of the torque limitter 18 so that the rotatable portion 11b of the single-position brake 11, the friction disc 21b of the friction clutch 21 and the rotatable portion 28b of the other single-position brake 28 are all rotated together with the spindle 4.

After the lapse of a preset time after the electric motor 16 starts its steady rotations, the electromagnet 12 of the single-position brake 11 is energized. Then, the rotatable portion 11b of the single-position brake 11 is attracted along the key 13 by the electromagnet 12 to approach the fixed portion 11a against the action of the elastic member 11c. Here, the meshing engagement between the rotatable portion 11b and the fixed portion 11a of the single-position brake 11 does not take place simultaneously with energization of the electromagnet 12. This is because that engagement is allowed once during one rotation of the rotatable portion 11b. Thus, when the rotatable portion 11b is further rotated by a preset angle together with the spindle 4 after the energization of the electromagnet 12, the rotatable portion 11b finds its only one engaging position with the fixed portion 11b so as to impart a preset load to the spindle 4. The difference in the number of rotations between the spindle 4, which is retarded by the preset load coming from the operation of the single-position brake 11, and the electric motor 16, which continues its steady rotations, can be absorbed by the slippage which takes place between the friction discs 18a and 18b of the torque limiter 18, thus preventing the steady rotations of the electric motor 16 after the operation of the single-position brake 11 from being transmitted to the spindle 4.

After the lapse of a preset time after the energization of the electromagnet 12 of the single-position brake 11 is started with the resultant meshing engagement between the rotatable portion 11b and the fixed portion 11a of the single-position brake 11, the electromagnet 12 is deenergized and the friction clutch 21 is actuated at the same time. When the energization of the electromagnet 12 of the single-position brake 11 is stopped, the rotatable portion 11b is moved along the key 13 apart from the fixed portion 11a by the biasing action of the elastic member 11c until the engagement between the rotatable portion 11b and the fixed portion 11a is released. On the other hand, the actuation of the friction clutch 21 is carried out such that its one friction disc 21a comes close to the other friction disc 21b. As a result, the spindle 4 is coupled to the rotary drum 8 by the operation of the friction clutch 21. Here, it should be noted that the spindle 4 thus coupled to the rotary drum 8, which is blocked from its idle rotations by the idle rotation preventive mechanism 38, can be completely free from its idle rotations, because the actuation of the friction clutch 21 is accomplished simultaneously with the termination of energization of the electromagnet 12 of the single-position brake 11. In these ways, the spindle 4 is coupled to the rotary drum 8, and accordingly the starting point of the indexed motion of the band-shaped work L which is loaded to the rotary drum 8. When the meshing engagement between the rotatable portion 11b and the fixed portion 11a of the single-position brake 11 is released by the termination of energization of the electromagnet 12 of the brake 11 to remove the preset load which has been applied to the spindle 4, and when the integral coupling between the spindle 4 and the rotary drum 8 is effected by the operational start of the friction clutch 21, the friction discs 18a and 18b of the torque limiter 18, which have been slipping to absorb the difference in the number of rotations between the electric motor 16 and the spindle 4, begin stopping their slippage. As a result, the rotations of the electric motor 16 are transmitted from its drive shaft 15 to the spindle 4 by way of the torque limiter 18 so that the rotatable portion 11b of the single-position brake 11, the friction clutch 21, the rotary drum 8, the brake drum 40 and the rotatable portion 28b of the other single-position brake 28 are all rotated together with the spindle 4. Thus, the band-shaped work L, which is loaded to the rotary drum 8, has its metal cords attracted by the permanent magnet plates 9 so that it can be delivered progressively by the indexed motion without any slippage with the outer periphery of the rotary drum 8. In this operation, however, both the indexing member 25 and the fixed portion 28a of the single-position brake 28, which is fixed to the inner side of the indexing member 25, are blocked from their rotations by the electric motor 16. This is because the shock absorber operating member 34 is positioned to abut against the leading end of the shock absorber 37.

After the lapse of a preset time after the operation of the friction clutch 12 is started, the electromagnet 30 of the single-position brake 28 is energized. As a result, the rotatable portion 28b of the single-position brake 28 is attracted by the electromagnet 30 to approach the fixed portion 28a along the key 13 against the action of the elastic member 32. Since, however, the rotatable portion 28b and the fixed portion 28a of the single-position brake 28 can mesh once each rotation of the rotatable portion 28b, it is normal that their meshing engagement does not take place simultaneously with the energization of the electromagnet 30. When the rotatable portion 28b is further rotated by a preset angle together with the spindle 4 after the energization of the electromagnet 30, the rotatable portion 28b is brought at its only one position into engagement with the fixed portion 28b so that the indexing member 25, the split holder 26 and the shock absorber operating member 34 are all about to be rotated. However, since the shock absorber 37 is fixed to the stationary frame 1 and since the shock absorber operating member 34 is in abutment engagement with the leading end of the sliding rod 37a of the shock absorber 37, the indexing member 25, the split holder 26 and the shock absorber operating member 34 cannot be rotated. As in the above, since the indexing member 25 is blocked from its rotations by the action of the shock absorber 37, a preset load is applied to the spindle 4 so that the number of rotations of the rotary drum 8 is abruptly reduced, thus stopping the delivery of the band-shaped work L. At this instant, since the sliding rod 37a of the shock absorber 37 is slightly shifted backward by the thrusting action of the shock absorber operating member 34, it is possible to damp the abrupt reduction in the number of rotations of the spindle 4, to which a preset load is imparted by the operation of the single-position brake 28, and to absorb the remarkably great impact which is imparted to the indexing apparatus of the present invention as a whole as a result of the reduction in the number of rotations of the spindle 4. The difference in the number of rotations between the spindle 4, which is retarded by the preset load coming from the operation of the single-position brake 11, and the electric motor 16, which continues its steady rotations, can be absorbed by the slippage which takes place between the friction discs 18a and 18b of the torque limiter 18, thus preventing the steady rotations of the electric motor 16 after the operation of the single-position brake 11 from being transmitted to the spindle 4.

After the lapse of a preset time after the energization of the electromagnet 30 of the single-position brake 28 is started with the resultant meshing engagement between the rotatable portion 28b and the fixed portion 28a of the single-position brake 28, the electromagnet 30 is deenergized, and not only the operation of the friction clutch 21 but also the steady rotations of the electric motor 16 are stopped at the same time. When the operation of the friction clutch 21 is stopped, its one friction disc 21b is separated apart from the other friction disc 21a along the key 13 until their frictional engagement is released. When, on the other hand, the energization of the electromagnet 30 of the single-position brake 28 is stopped, its rotatable portion 28b is shifted apart from the fixed portion 28b along the key 31 by the biasing action of the elastic member 32 so that the two portions 28a and 28b are released from their engaging conditions. In these ways, although both the load, which has been applied to the spindle 4 from the idle rotation preventive mechanism 38 by way of the rotary drum 8, and the load, which has also been applied thereto from the single-position brake 28, are eliminated from the spindle 4, this spindle 4 is blocked from its free rotations by the load which is applied thereto from the torque limiter 18. In the manner thus far described, the end point of the indexed motion of the band-shaped work L which is fed to and delivered from the rotary drum 8 can be determined.

In case it is intended to change the length between the starting point and the end point of the indexed motion, all the operations required are to loosen the bolts 27 and to turn the indexing member 25 by fitting a suitable tool in its holes 25a such that the relative positions of the fixed portion 28a and the rotatable portion 28b of the single-position brake 28 fixed to the indexing member 25 are changed. Thus, it is possible to suitably preset the timing of the operational command which is to be detected by the end point determining mechanism 22.

The band-shaped work L thus having its end point determined is stamped with an end point mark by a suitable stamping device which is arranged in the vicinity of the rotary drum 8 although not shown.

The foregoing sequential operations of the indexing apparatus according to the present invention are directed to one cycle, in which the band-shaped work L is progressively indexed with a preset length. This cycle is repeated subsequently for the continous operations.

As will be easily understood, the starting and stopping operations of the steady rotations of the electric motor 16, the starting and stopping operations of the energization of the electromagnets 12 and 30 of the single-position brakes 11 and 28, and the starting and stopping operations of the friction clutch 21 are all carried out in accordance with a preset program. Thus, the whole operations of the indexing apparatus for the band-shaped works according to the present invention can be performed completely automatically.

In the embodiment thus far described, incidentally, the band-shaped work to be indexed is a breaker ply, in which metal cords are impregnated with rubber. Therefore, a number of permanent magnet plates are embedded in the outer periphery of the rotary drum so as to ensure the accuracy in the indexing operation of the present invention while eliminating the "slippage" which might otherwide take place between the breaker ply and the rotary drum. However, in case the band-shaped work is a carcass ply, in which fiber cords are impregnated with rubber, a number of needles may be arranged to project from the outer periphery of the rotary drum so as to eliminate the slippage between the carcass ply and the rotary drum. Moreover, the band-shaped work to be used in the present invention should not be limited to the above two types, namely, the breaker ply having the rubber-impregnated metal cords or the carcass ply having the rubber-impregnated fiber cords but can be a relatively soft band-shaped material such as paper or plastic film. For example, in the case of paper, there may be arranged in the vicinity of the rotary drum an auxiliary roller which has its outer periphery brought into contact with that of the rotary drum so as to eliminate the slippage between the paper and the rotary drum. In short, no matter what material may be used as the band-shaped work in the present invention, the rotary drum can suffice its function if it is formed with such a cylindrical outer periphery as can eliminate the possible slippage between itself and the band-shaped material.

Figure 4:
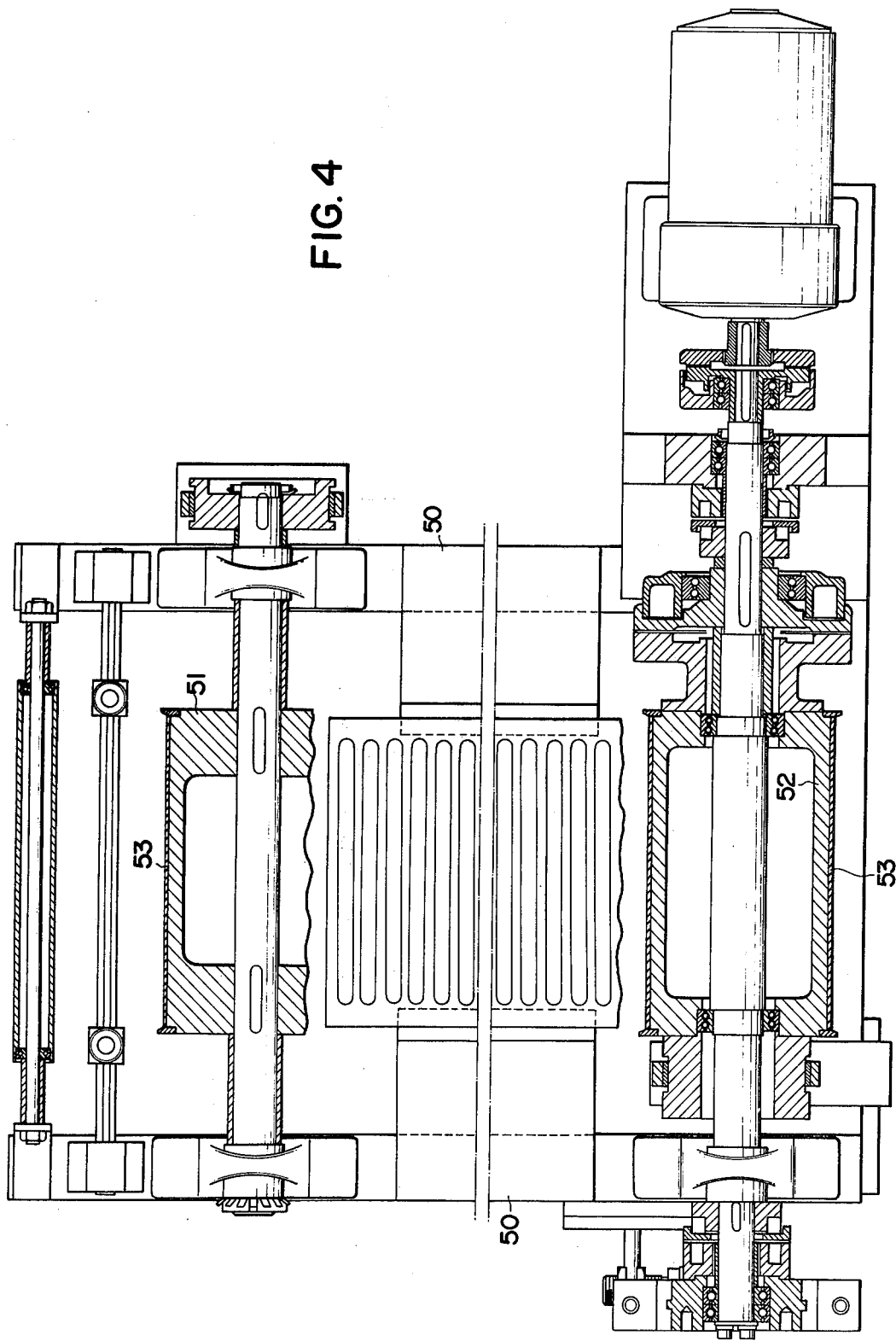
FIG. 4 is similar to FIG. 1 but shows another embodiment of the present invention.

In the foregoing embodiment, moreover, the rotary drum is composed of a single drum having cylindrical outer periphery. The rotary drum to be used in the present invention should not be limited to such single type drum but may be composed, as shown in FIG. 4, of a driven pulley 51, which is rotatably supported in a stationary frame 50, of a drive pulley 52, which is also rotatably supported in the stationary frame 50 such that it is arranged at a spacing from the driven pulley 51 and that it has its spindle oriented in parallel with that of the driven pulley 51, and of an endless belt 53 which is arranged to run on the driven and drive pulley 51 and 52 so as partly to transmit the rotations of the drive pulley 52 to the driven pulley 51 and partly to continuously deliver the band-shaped work L loaded thereto.

As has been described hereinbefore, according to the present invention, the control of the indexing operation is accomplished purely mechanically without resorting to an electric control. The mechanical control of the invention uses a single-position brake, an idle rotation preventive mechanism and a friction clutch of back-lashless type. As a result, it should be appreciated as an advantage of the present invention that the indexing apparatus as a whole can have such a simple construction as remarkably facilitating its inspection and maintenance. It should also be appreciated that the accuracy in the indexing operation can be markedly improved because the conversion error which might otherwise be inevitably concomitant with the electric control is reduced to zero. It should also be appreciated that the production cost of the indexing apparatus as a whole can be minimized because the overall construction is simple.

What is claimed is:

1. An indexing apparatus for progressively indexing a band-shaped work, comprising: a relatively stationary frame; a spindle rotatably supported in said stationary frame; a rotary drum rotatably supported on said spindle and having such an outer periphery of cylindrical shape as can prevent slippage with said band-shaped work; starting point determining means mounted to said spindle for applying a preset load to said spindle in accordance with the single operational command, which is detected during one rotation of said spindle, so as to determine the starting point of said band-shaped work loaded to said rotary drum; end point determining means mounted to said spindle for applying a preset load to said spindle in accordance with the single operational command, which is detected during one rotation of said spindle, so as to determine the end point of said band-shaped work loaded to and delivered from said rotary drum; drive means for driving said spindle and for absorbing the difference in the number of rotations from the spindle which is retarded in its number of rotations by the preset loads given thereto from said starting point determining means and said end point determining means; rotation interrupting means interposed between said rotary drum and said drive means for interrupting the transmission of the rotations of said spindle by said drive means to said rotary drum so that the rotations of said spindle by said drive means may be transmitted to said rotary drum only when said end point determining means is to be operated; indexing means for suitably presetting the timing of the operational command, which is to be detected by said end point determining means, so as to suitably index the band-shaped work which is loaded to and delivered from said rotary drum; and idle rotation preventive means for applying a slight load to said rotary drum at all times so as to block said rotary drum from its idle rotations.

2. An indexing apparatus as claimed in claim 1, wherein said end point determining means includes a shock absorber means for damping the abrupt reduction in the number of rotations, which takes place in said spindle when said preset load is applied to said spindle from said end point determining means.

3. An indexing apparatus as claimed in claim 2, wherein said shock absorber means includes an shock absorber operating member mounted in said end point determining means, and a shock absorber made coactive with said shock absorber operating means for damping the abrupt reduction in the number of rotations, which takes place in said spindle when said preset load is applied to said spindle from said end point determining means.

4. An indexing apparatus as claimed in claim 1, wherein said drive means includes means for driving said spindle, and a torque limiter interposed between said electric motor and said spindle for effecting slippage in the rotations between said electric motor and said spindle to prevent the steady rotations of said electric motor from being transmitted to said spindle so as to absorb the difference in the number of rotations between the spindle, which is retarded by said preset loads given thereto from said starting point determining means and said end point determining means, and the electric motor which is performing its steady rotations.

5. An indexing apparatus as claimed in claim 1, wherein said rotation interrupting means includes a friction clutch for effecting coupling between said rotary drum and said spindle so as to transmit the rotations of said spindle by said drive means to said rotary drum in a back-lashless manner.

* * * * *